United States Patent [19]

Marocco

[11] Patent Number: 5,131,378
[45] Date of Patent: Jul. 21, 1992

[54] METHOD FOR THE PRODUCTION OF REINFORCED PANELS FROM A BLOCK OF BUILDING MATERIAL, SUCH AS STONE

[75] Inventor: Giuseppe Marocco, Turin, Italy

[73] Assignee: Tecnomaiera S.r.l., Italy

[21] Appl. No.: 458,693

[22] PCT Filed: May 26, 1989

[86] PCT No.: PCT/EP89/00581
§ 371 Date: Jan. 29, 1990
§ 102(e) Date: Jan. 29, 1990

[87] PCT Pub. No.: WO89/11958
PCT Pub. Date: Dec. 14, 1989

[30] Foreign Application Priority Data

Jun. 1, 1988 [IT] Italy ............... 67510 A/88

[51] Int. Cl.⁵ .................................. B28D 1/00
[52] U.S. Cl. .................. 125/16.01; 125/12; 51/283 R; 51/327
[58] Field of Search .............. 51/283 R, 327; 125/13.01, 13.03, 12, 16.01, 1; 156/154; 52/612

[56] References Cited

U.S. PATENT DOCUMENTS

| | | | |
|---|---|---|---|
| 3,950,202 | 4/1976 | Hodges | 156/54 |
| 4,177,789 | 12/1979 | Marocco | 125/1 |

FOREIGN PATENT DOCUMENTS

| | | |
|---|---|---|
| 0252434 | 1/1988 | European Pat. Off. . |
| 0823728 | 12/1951 | Fed. Rep. of Germany . |
| 2156181 | 5/1973 | Fed. Rep. of Germany . |
| 2255174 | 7/1975 | France . |
| 2405625 | 5/1979 | France . |

Primary Examiner—Robert A. Rose
Attorney, Agent, or Firm—Sughrue, Mion, Zinn, Macpeak & Seas

[57] ABSTRACT

The method is of the type in which a block of natural or artificial building material is subjected to multiple cutting so as to form a partially-worked block constituted by a series of preliminary parallel plates (18) separated by fissures (16) and interconnected by an uncut part (20) of the block itself. A setting fluid filler (42) product is introduced into the fissures and is left or made to set. Finally, the block is subjected to a second multiple cutting through its entire extent, along intermediate planes of the preliminary plates (18), so as to divide them in the sense of their thickness and produce pairs of final plates which are interconnected along one edge by a corresponding portion (40) of the base part (20). As well as the setting fluid filling product (42), a solid reinforcing material (28) is introduced into the fissures and is intended to remain connected to the final plates (38). According to one aspect of the method, a separator layer or sheet (44) which has release properties with respect to the set filler product is also inserted in the fissure (16). The edges of the final plates (38) are then trimmed so as to remove both the set product (42) and the said portion (40) of the base part (20), so as to produce a pair of separate panels, at least one of which is reinforced.

21 Claims, 3 Drawing Sheets

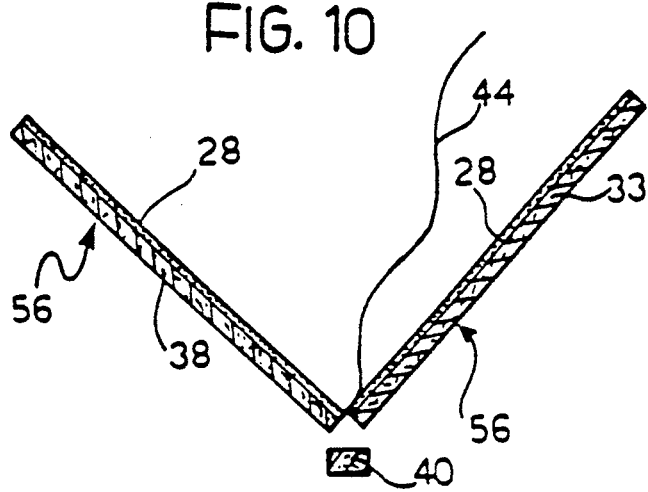
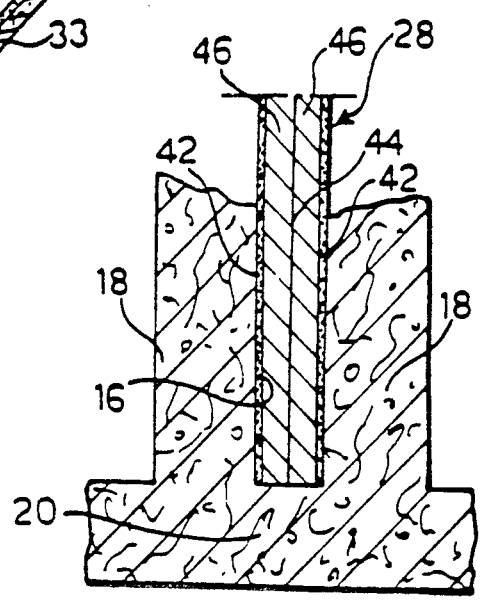
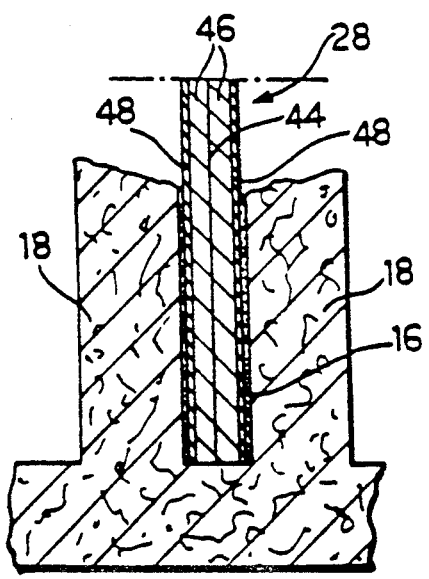
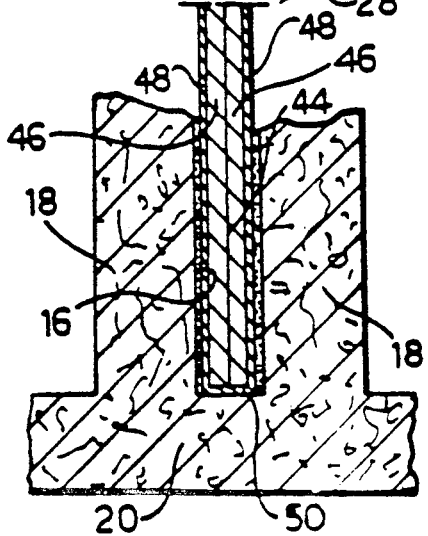
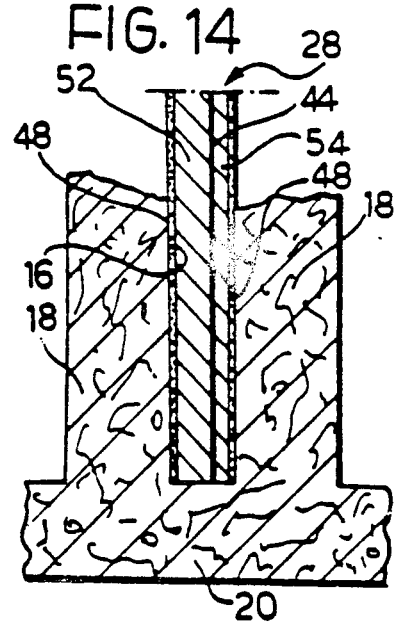

1

METHOD FOR THE PRODUCTION OF REINFORCED PANELS FROM A BLOCK OF BUILDING MATERIAL, SUCH AS STONE

The present invention relates to a method for the production of panels from a block of building material.

Throughout the present description and in the claims, building material means either a natural stone material, such as marble or granite, or an artificial material, for example, a composite material such as a conglomerate based on fragments of natural stone, a reconstituted marble, etc.

BACKGROUND OF THE INVENTION

A method according to the preamble of the base claim is known from the document U.S. Pat. No. 4,177,789 and from the corresponding foreign documents.

This document describes and shows a method for the production of very thin plates by the sawing of a block of marble, granite or similar stone material with a multi-blade frame. In this method, a block cut, as it were, "like a comb" is produced by means of a first multiple cut with a multi-blade frame and comprises a plurality of preliminary plates separated by fissures. A spacer material is then introduced into the fissures. A preferred spacer material in the known method is a setting fluid filler product, in particular a polyurethane foam. The fluid product is then left to set in the fissures, so as to form a solid spacer material.

After the spacer material has set, the known method proceeds to a second cutting by means of sawing with the same multi-blade frame. The second cutting takes place through the entire depth of the block along median planes of the preliminary plates, preferably so as to halve them in the sense of their thickness. During the second cutting, the spacer material which has set in the fissures prevents the preliminary plates from breaking.

Upon the completion of this operation, the known method produces a plurality of sandwiches formed by pairs of sheets, between which is a core of set resin and which are connected at one side by a part corresponding to the base of the block which was not cut during the first sawing.

In one case, these sandwiches are subjected to external finishing and then subjected to trimming operations to separate the final plates.

In certain circumstances, the same sandwiches could themselves constitute panels having two opposite, decorative outer faces. However, their structural strength is low due to the fact that the resin forming the core does not have good mechanical characteristics.

A first object of the invention is to provide a method which enables a sandwich of the type in question to be given mechanical strength such as to make it suitable for use as a structural panel with actual load-bearing characteristics.

This object is achieved by means of a method as defined in the characterising part of claim 1 and in the dependent claims 3 to 12.

By virtue of this concept, after the second cutting, a plurality of sandwiches are obtained directly from the block which are reinforced by a reinforcement constituted by the core and each of which, after surface finishing and any trimming of the edges, has two decorative faces and constitutes a panel which is both decorative and structural, that is, having mechanical strength, the latter characteristic being due to the reinforcement constituted by the core. Reinforced panels, for example, for the external cladding of buildings, can therefore be produced, the thickness and weight of which are much less than those of conventional cladding plates but which have much greater mechanical strength.

The resin used as the spacer material in the method known from the document U.S. Pat. No. 4,177,789 has binding properties with respect to the stone material, to ensure that the block becomes monolithic again in view of the second cutting. The two final plates of the sandwich are thus joined together by the spacer material. In order to obtain two separate, thin final sheets from the sandwich, their common part is removed by cutting and the central cutting of the resin core is then carried out. Finally, the remains of the resin of the core are removed from the corresponding faces of the final plates by a finishing operation.

Since these plates are very thin, perhaps only 5 mm thick, they are susceptible to breakage during the finishing and, moreover, if they are without reinforcement, they do not themselves have the necessary mechanical strength for certain applications. In one embodiment of the known method, respective reinforcing layers, which can also be heat-insulating or sound-absorbent, are applied to the outer faces of the sandwich to reinforce them. These layers may consist, for example, of one or more sheets of resin-impregnated glass fibres.

If the reinforcing properties are not required, the covering layers of the known method may be constituted by glass wool, expanded material, and the like.

The application of the covering layer to the faces of the individual sandwiches involves a certain expense which it would be desirable to reduce.

Another object of the invention is to produce panels constituted by a thin decorative plate which is reinforced so as to have good mechanical characteristics directly by a method similar to that of the document U.S. Pat. No. 4,177,789, but without the subsequent application of the reinforced covering layer.

According to the invention, this object is achieved by a method according to claim 2 and the subsequent claims.

This concept overcomes the prejudice whereby the central cutting of the preliminary plates could not be carried out safely, without breakage, in the absence of the intimate joining of the plates by means of a core of set material, such as a resin: in the document U.S. Pat. No. 4,177,789, an incoherent material, such as sand, was also proposed as the spacer material. Tests carried out with this incoherent material gave mediocre results, that is, an unacceptable percentage of breakages of the plates during the second cutting. This gave rise of the above prejudice.

Surprisingly, however, it has been found that when the fissures are filled at the same time with a reinforcing material and with a set filler product, particularly a resin which closes the structural gaps in the material, it is not in fact necessary for adjacent preliminary plates to be joined together intimately so that they do not shatter during the second cutting. On the basis of this fact, if a release layer or sheet is interposed in the filler material, composite plates or panels are obtained directly upon completion of the second cutting and after finishing, and are already provided with the reinforcement which, according to the known method, had to be applied by a separate operation. By virtue of the invention, this separate operation is eliminated with an obvious saving.

The preferred reinforcing materials will be specified in the course of the description with reference to the drawings. From the various possibilities, one which appears of great interest is that of the use of a sheet of glass or other transparent material as the reinforcing material. It is thus possible to produce plates like those described and illustrated in the document U.S. Pat. No. 4,640,850, but by a much more economical method than the one described in that document.

BRIEF DESCRIPTION OF THE DRAWINGS

Further characteristics and advantages of the present invention will become clear from a reading of the following detailed description of some preferred embodiments, provided by way of non-limiting example. This description is made with reference to the appended diagrammatic in which:

FIG. 10 is an end elevational view which shows the separation of two thin reinforced plates upon completion of the trimming of FIG. 9, and FIGS. 11 to 14 are fragmentary cross-sections corresponding to the stage of FIG. 5, in which various structures of the inserts introduced into the fissures after the first cutting are shown by way of example.

DETAILED DESCRIPTION OF THE INVENTION

Figure 1:
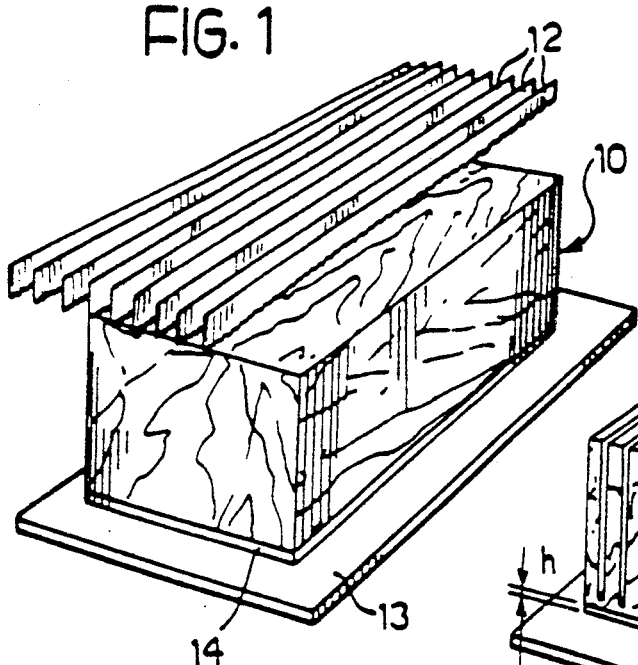
FIG. 1 is a perspective view of a block which is about to be subjected to a first cutting in the method according to the invention.

FIG. 1 shows a block 10 which may be of any stone or other type of material. For example, the material may be natural marble or granite, or may be a block of reconstituted stone material, such as, for example, that described and illustrated in the document U.S. Pat. No. 4,092,393 to which reference should be made.

The block 10 is first of all subjected to a first cutting. This first cutting is preferably a sawing carried out according to the teaching of the document U.S. Pat. No. 4,177,789, which should be referred to for further details. This sawing is carried out with a horizontal multi-blade frame whose blades are shown at 12.

During the first sawing, the block 10 rests on a platform 13 which may be the loading platform of a truck or may rest on this loading platform. An expendable board 14 of wood or other material which can be sawn is preferably interposed between the block 10 and the platform 13

The distance between the centres of the blades 12 may, for example, be of. the order of 20 to 25 mm.

Figure 2:
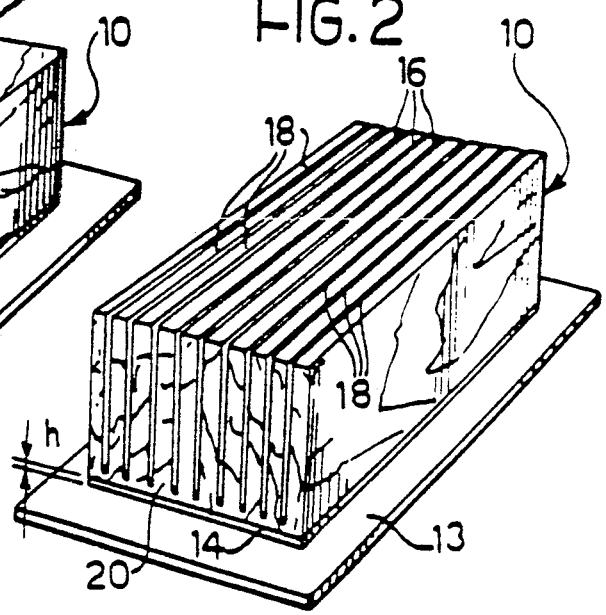
FIG. 2 is similar perspective view of the block after the first cutting.

As shown in FIG. 2, several cuts or vertical fissures 16 are made in the block 10 by means of the first sawing, each of which corresponds to one of the blades 12. The latter are moved downwards in the block 10 to a height h, of the order of 2-5 cm, from the lower face. A partially-worked block is thus produced which is constituted by a series of preliminary parallel plates 18 separated by the fissures 16 and interconnected, in correspondence with the lower face of the block 10, by an unsawn part 20 of the block itself.

Alternatively, as in the document U.S. Pat. No. 4,177,789, the base of the block such as 10 may be embedded, in a set binding material intended to fulfill the function of the unsawn part 20. In this case, the first sawing takes place through the entire depth of the block.

Figure 3:
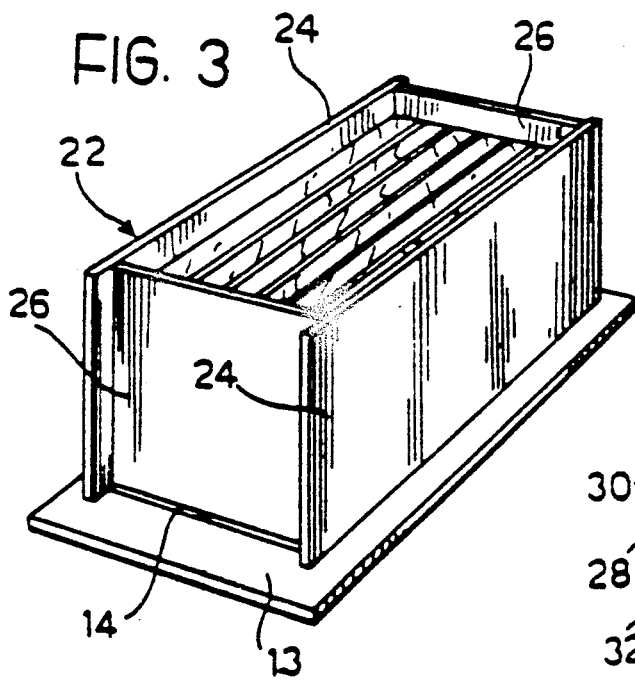
FIG. 3 is a perspective view of the same block prepared for the pouring of a setting resin.

After the first sawing, the block 10, still supported by the platform 13 with the interposition of the board 14, is enclosed in a form 22, as shown in FIG. 3. The form 22 is constituted by four continuous side and end walls 24, 26, for example of steel. These walls 24 and 26 are sealed to each other and to the platform 13 along continuous liquid- and gas-tight seams. Their inner faces are treated with a release material. Alternatively, however, the end walls 26 may be glued against the corresponding vertical edges of the preliminary plates 18 resulting from the first sawing: in this case, the end walls 26 must be constituted by an expendable material, such as wood, thin sheet metal or even glass, since it is destined to undergo the second sawing of which more will be mentioned below, together with the block 10.

The walls 24 are preferably strengthened by ribbing (not shown) and are fixed to each other at the sides of the block 10, as well as to the platform 13, at a sufficient number of points to resist both the hydrostatic thrust generated by the impregnating liquid, which will be mentioned further below, and the momentary sudden changes in pressure which may occur in the course of the impregnation, without appreciable deformation.

The height of the four walls 24, 26 exceeds that of the block 10 by several centimeters so that it forms a sufficient reserve for the total impregnation of the block after the introduction of the impregnating liquid to the maximum level.

The impregnation operation takes place according to the teachings of the document U.S. Pat. No 4,013,809.

In particular, the unit of FIG. 3 is subjected initially to an operation to dry and preheat the block 10 in order to eliminate the water which impregnates its material after the first cutting.

After the drying and the preheating, a solid reinforcing material is introduced into the fissures 16.

Figure 4:
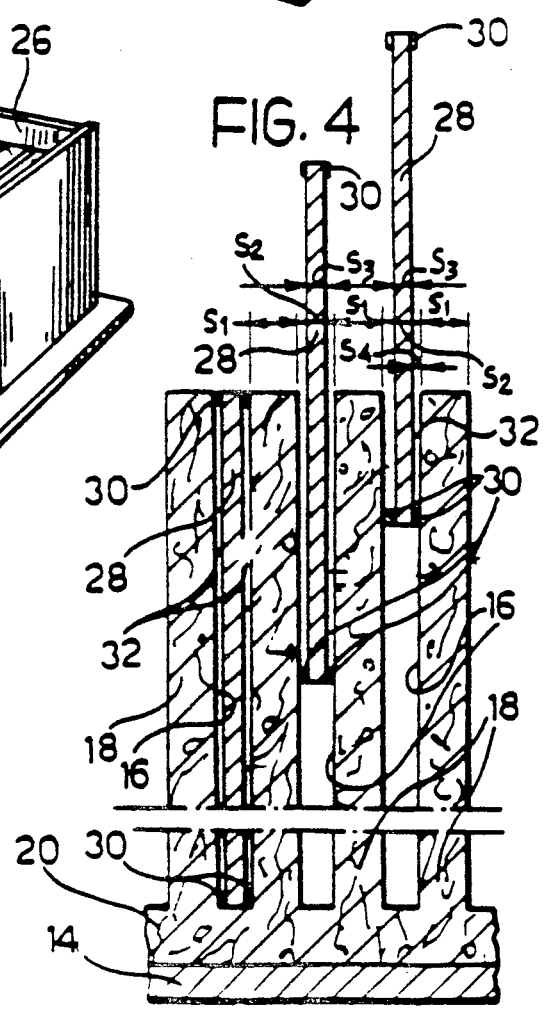
FIG. 4 is a fragmentary cross-section which shows the stage of the introduction of inserts into the fissures formed in the block by means of the first cutting.

As shown in FIG. 4, this reinforcing material is in the form of rigid inserts 28 which may be of various kinds, examples of which will. be described below with reference to FIGS. 11 to 14.

For now it suffices to say that, leaving out of consideration the material or materials of which they are made, their thickness and their type of structure, these inserts are introduced into the fissures 16 produced by the first sawing and, depending on the circumstances, may be constituted by:

whole sheets with surface dimensions substantially equal to those of the fissures 16 in both directions;

horizontal strips with horizontal dimensions substantially equal to the longitudinal dimensions of the block 10, inserted into the fissures 16 one above the other;

vertical strips with vertical dimensions substantially equal to the height of the block, inserted into the fissures 16 one beside the other.

Moreover, the total thickness of the inserts 28 placed in each fissure 16 must always be less than that of the fissure itself, so as to enable not only the insertion operation but also good penetration of the impregnating liquid within the fissures 16 and wetting of the materials present.

FIG. 4 shows peripheral spacers, indicated 30, with which the inserts 28 are provided to keep them centred in the fissures 16, leaving a small space 32 between the inserts and the faces of the preliminary plates 18.

By way of example, the preliminary plates 18 may have a thickness $s_1$ of 20 mm, the fissures 16, as already stated, may have a width $s_2$ of 5 mm, and the inserts 28 may have a thickness $s_3$ of 4 mm, thus leaving respective spaces 32 of a width $s_4$ of 0.5 mm between the inserts 28 and the preliminary plates 18.

Once the inserts 28 have been positioned at the bottom of the fissures 16 like the left-hand insert of FIG. 4, the impregnation treatment of the block 10 thus prepared is carried out.

The impregnation is carried out in an autoclave according to the teaching of the document U.S. Pat. No. 4,013,809, which should be referred to for all the details.

For simplicity, the term "resin" will be used in the present description to indicate any suitable liquid product which can set. However, two-component synthetic resins (epoxy resins, polyester resins and others) are preferred as the setting fluid filler product.

The impregnating resin, however, has the characteristic that, in a longer or shorter time, it sets by an internal chemical transformation which, upon completion, causes it to:

adhere strongly to all the walls of the space occupied, except the release layers;

acquire characteristics of mechanical strength substantially comparable to those of the stone or other material with which it is in contact.

According to a preferred embodiment, the impregnating resin is introduced, as in the document U.S. Pat. No. 4,092,393, by being poured into the prepared space from above by a suitable distribution system. With this method, the stone material is dried thoroughly and the liquid resin is degassed at the time of its introduction.

The distribution systems are such as to ensure maximum uniformity of filling of all the fissures 16 containing the inserts 28, so as to avoid the temporary formation of perceptible pressure differences between one fissure and another, which could lead to the breakage of the preliminary plates 18.

The introduction of the impregnating liquid ends when the block 10 is submerged under a head of liquid of several centimeters.

In an alternative embodiment, the bottom pouring of the liquid resin, that is, from below, is envisaged. Bottom pouring is of interest since, in certain cases, it enables the treatment under vacuum in an autoclave to be avoided. During the course of the bottom pouring, the air which is present in each each fissure 16 is forced upwards with less problems in its evacuation than when the resin is poured from above.

The actual impregnation may be omitted when the stone material is sufficiently compact for the penetration of the resin into small spaces in the body of the material (through impregnation) to be unnecessary and when the inserts 28 provided are of a type and conformation such as to enable good wetting of the whole available surface at the stage of introduction of the filler resin.

However, in most cases, these conditions do not occur since a stone material almost inevitably has flaws, spaces, etc., whereby actual impregnation is necessary. This impregnation is achieved according to the teaching of the document U.S. Pat. No. 4,013,809 by the exertion of a thrust overpressure on the liquid resin in the autoclave before it sets, which forces it to occupy all the cavities (spaces, cracks or other flaws) in the body of the material.

As described in the document U.S. Pat. No. 4,013,809, the overpressure may simply consist of a return of the internal atmosphere of the autoclave to atmospheric pressure, with a consequent differential pressure on the free surface of the resin.

Before we go on to describe the second cutting or sawing, an alternative embodiment of the method for the pouring of the resin will be mentioned.

In this embodiment, which corresponds to the teaching of the document U.S. Pat. No. 4,177,789, the block itself is used as the form. This embodiment is advantageous when the block is of granite or certain other stone materials that can be sawn with frames, known as filing frames, which do not have diamond blades. In filing frames, the blades wear rapidly and are replaced for each sawing operation. When the block itself is used as the form, it is necessary only to remove the end blades of the set upon the replacement of the blades, in order to obtain from the first sawing a block whose sides are constituted by preliminary plates of greater thickness than the others. The containing walls are not wasted material, since they can be transformed into conventional plates during the second sawing.

The thicker plates act as the containing walls of the form. In order to complete the form, it is then necessary to stop the first sawing so that the thickness of the material beneath the bottoms of the fissures is comparable to that of the side walls. The formation of the block-form is completed by the application of end walls, as indicated 26 in FIG. 3. Moreover, a frame, for example of wood, fitted around the upper edge of the block acts as a tank for containing the excess resin above the fissures.

With the use of a filing frame, the bottoms of the fissures produced by the first sawing inevitably have surplus material, at least in the centre, due to the wear of the blades. This surplus material is situated in correspondence with the unsawn base 20 of the block which is eliminated later, as described below. From this point of view, even if the material of the base 20 can be considered a loss, this loss is taken for granted and should not be considered as a negative effect of the elimination of the form.

Figure 5:
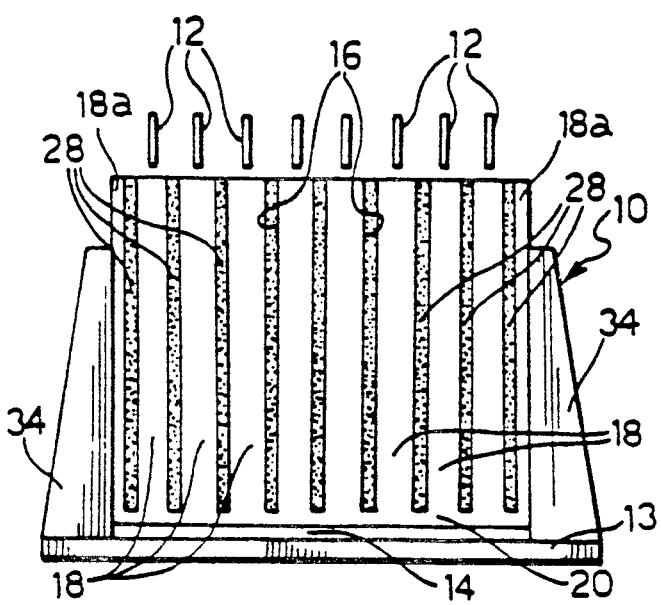
FIG. 5 is an end elevational view of the block prepared for the second cutting.

After the resin has set, as shown in FIG. 5, a block 10 is produced in which the fissures 16 are completely filled by the cores 28 and by the resin which has completely filled the spaces 32 of FIG. 4.

As shown in FIG. 5, the composite block 10 is replaced under the multi-blade frame and its transverse position relative to the blades 12 is adjusted micrometrically until the blades 12 are situated in correspondence with the predetermined intermediate planes of the preliminary plates 18. The intermediate planes may be median planes, whereby the preliminary plates 18 give rise to two final plates of equal thickness when the blades 12 subsequently move downwards. Alternatively, the intermediate planes may not be median planes, whereby two final plates of different thicknesses are produced.

The sides of the block 10 are preferably held by supports 34 during the second sawing, to avoid the breakage of the outermost preliminary plates 18a which are usually thinner than the others.

Figure 7:
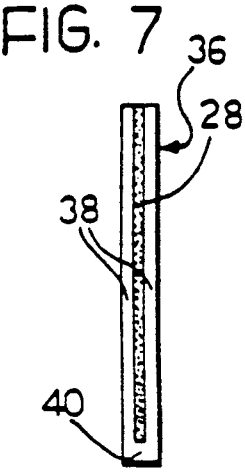
FIG. 7 is an end view of one of the sandwiches produced upon completion of the second cutting.
Figure 6:
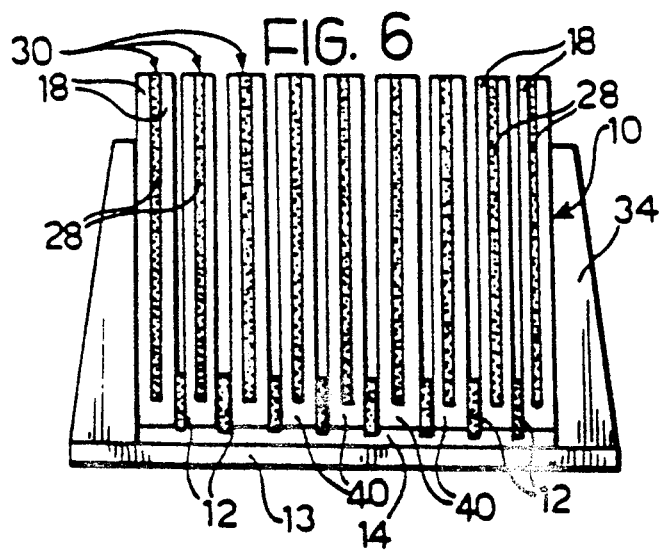
FIG. 6 is a view similar to FIG. 5, upon completion of the second cutting.

As shown in FIGS. 6 and 7, upon the completion of the second sawing, sandwiches 36 are produced, each of which is constituted by a pair of final plates 38 connected by a corresponding portion 40 of the base part 20.

The sandwiches 36 may be used as they are after surface finishing and trimming of the excess resin at the edges. The base portion 40 may not even be removed.

If the sandwich 36 is to be used as it is, it constitutes a panel with two faces having a decorative appearance and incorporating a reinforcing core 28 which provides it with good mechanical properties. In this case, the core 28 may not even be constituted by a rigid insert, but simply by a solid, fibrous reinforcing material, such as glass fibre, incorporated in the resin. Otherwise, the core is constituted by an insert 28 having a structure similar to that illustrated in FIGS. 11 to 13.

In an alternative embodiment of the invention, the inserts incorporate a separator layer.

Figure 8:
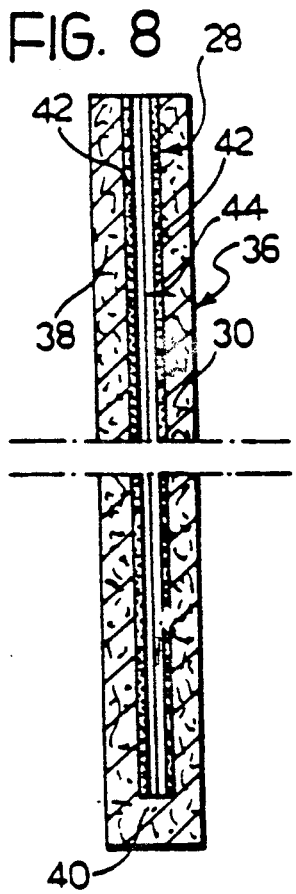
FIG. 8 is a cross-section of the sandwich on an enlarged scale, showing its internal structure according to a preferred embodiment.

FIG. 8 shows a sandwich 36 which contains an insert, again designated 28. The layers of resin which bind the insert 28 to the two final plates 38 are indicated at 42. The insert 28 incorporates a central separator layer 44 which divides it into two halves. This separator layer 44 may consist of a thin sheet of a material having release properties with respect to the resin, such as a sheet of polyethylene. Alternatively, the separator layer 44 may be a layer of an actual release material, such as silicone oil, spread on the mating surfaces of the two halves of the insert 28.

The separator layer 44 may also be arranged, for example by gluing, on one face or the other of the insert 28.

Figure 9:
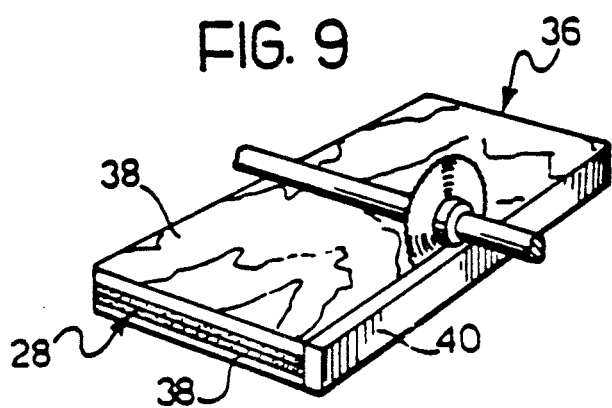
FIG. 9 is a perspective view which shows the sandwich of FIG. 8 being subjected to a trimming operation.

FIG. 9 shows the operation of trimming with a saw, by which the base portion 40 of the sandwich and the rest of its edges are removed. Upon the completion of this operation, the two final plates 38 separate without offering any resistance, as shown in FIG. 10. Each of them is reinforced by the corresponding part of the core 28. The detached separator layer is again indicated 44, for the case in which this layer is constituted by a sheet.

FIGS. 11 to 14 show various examples of the structure of the inserts 28 in the condition which corresponds to FIG. 4. The resin layers are again indicated 42 and the separator layer is again indicated 44. When panels with a sandwich structure like the panel 36 of FIG. 7 are required, the separator layer 44 is omitted.

In FIG. 11, the insert 28 is constituted by two reinforcing sheets or plates 46 which may, for example, be of asbestos cement, formica, or other suitable material, as well as by the separator material.

In FIG. 12, the insert 28 includes two reinforcing layers 48 which may consist of wire netting, sheet metal, perforated sheet metal or other suitable material, as well as the plates 46 of the aforementioned materials. Amongst the materials which are suitable, resin-impregnated fabrics and felts of glass fibre and the like may be mentioned.

In the latter case, as shown in FIG. 13, the reinforcing layers 48 form part of a single sheet element which is bent into a U-shape and into which the reinforcing plates or sheets 46 are fitted with the possible interpositioning of the separator layer 44.

The transverse part of the U, which is situated at the bottom of the fissure 16 and is removed by the operation shown in FIG. 9, is indicated 50. The U-shaped arrangement of the reinforcing layers 48 may also be convenient for wire netting and thin sheet metal.

FIG. 14 shows an embodiment of great interest. In this embodiment, the insert includes a transparent sheet of glass 52 on one side of a separator layer or sheet 44. Preferably, sheets of glass having the minimum thickness compatible with good mechanical strength are used. This minimum thickness is 3 mm. With fissures 16 of a width of 5 mm, it is possible to introduce only one sheet of glass 52 into each fissure. In this case, the insert 28 is constituted by a pack which includes the sheet of glass 52, the separator layer 44 (polyethylene sheet, silicone oil, etc.) and a reinforcing layer 54 which may be constituted by a gauze 54 of glass fibres or the like.

After the separation of the two final plates, two panels 56 (FIG. 10) are obtained from each sandwich, one of which comprises a final plate of stone material reinforced by a gauze of glass fibres 54 or the like, and the other of which comprises a similar plate reinforced by the sheet of glass 52.

Naturally, it is also possible to use inserts 28 comprising two thinner sheets of transparent glass, or to form fissures 16 of a greater width to receive two sheets of glass, for example of 3 mm, in order to obtain two panels of thin stone material with protective surfaces of transparent glass from each sandwich.

Plates of this type were previously obtained by a fairly complex method which is described and illustrated in the document U.S. Pat. No. 4,640,850. By this method, a sheet of transparent glass was applied to a plate of stone material by means of a sheet of polyvinyl butyral.

With a core 28 such as that of FIG. 14, comprising two sheets of transparent glass, composite plates or panels are obtained which have the same qualities as those produced by the known method but are much cheaper. In an embodiment such as that of FIG. 14, the impregnating material acts as a glue between each glass sheet and the stone plate facing it. When it is introduced under vacuum and subsequently compressed in the absence of air in the impregnation stage, the impregnating resin wets the two materials completely and thoroughly. If it is sufficiently transparent and colourless, the image of every smallest detail of the surface of the stone material, is transmitted by refraction to the surface of the glass with an aesthetic result which is identical to that which can be obtained by the polishing of the stone material: the surface defects filled by the set resin are no longer visible. The glass, given its properties of durability, will keep this surface appearance intact for a very long time.

Moreover, the glass constitutes a very good reinforcing layer for the thin stone plate, such as to make any other reinforcement on the opposite face of the panel unnecessary for most applications.

The embodiments of the inserts 28 described and illustrated are simply examples and their structure is left to the technical knowledge and wishes of those skilled in the art.

Thus, the fissures 16 of a block could, amongst other things, be filled with inserts which differ from one fissure to another in order to produce a reinforced sandwich on the one hand, and thin reinforced panels of different kinds on the other.

I claim:

1. A method for the production of panels from a block (10) of building material, in which the block (10) is subjected to a multiple cutting so as to form a partially-worked block constituted by a series of parallel preliminary plates (18) separated by fissures (16) and interconnected at one face of the block by a base part of the block; a settable fluid filler product (32) is then introduced into the fissures and made to set; the block (10) is subjected to a second multiple cutting on intermediate planes through the entire extent of the block, so as to divide the preliminary plates and produce pairs of final plates (30) each interconnected along one edge with an adjacent final plate by a portion of said base part of the block; wherein a respective solid sheet or plate reinforcing material, intended to remain connected to at least one of the final plates, is introduced into each fissure before the settable fluid filler product is introduced into said fissures.

2. A method according to claim 1, wherein a separator layer (44) which has release properties with respect to the set filler product (42) is also inserted into the fissures (16), and in that the edges of the final plates (38) are trimmed so as peripherally to remove both the set product (42) and the portion (40) of the base part (20) and thus produce a pair of separate panels (56), at least one of which is reinforced.

3. A method according to claim 2, wherein the sheet or plate reinforcing material has a thickness less than the width of the fissure.

4. A method according to claim 1 wherein the sheet or plate reinforcing material has a thickness less than the width of the fissure.

5. A method according to claim 4, wherein the sheet material inserted into each fissure (16) is constituted by one or more sheets or plates (46) which extend through the entire fissure.

6. A method according to claim 4, wherein the sheet or plate reinforcing material inserted in each fissure (16) is constituted by a plurality of strips placed side by side and edge to edge in the sense of the length of the respective fissure (16).

7. A method according to claim 5, wherein the sheet or plate material is sheet metal.

8. A method according to claim 7, wherein the sheet metal is of the perforated type.

9. A method according to claim 5, wherein the sheet material (46) is netting.

10. A method according to claim 5, wherein the sheet material (46) is a fabric or felt of glass fiber or the like.

11. A method according to claim 5, wherein the sheet or plate material (46) is a plastics laminate.

12. A method according to claim 5, wherein the sheet or plate material (46) is asbestos cement.

13. A method according to claim 2, wherein at least one reinforcing sheet or plate (46; 48; 52; 54) and the release layer (44) are inserted in each fissure (16).

14. A method according to claim 13, wherein a pair of reinforcing sheets- or plates (46; 48; 52; 54) are inserted in each fissure (16) with the interposition of the release layer (44).

15. A method according to claim 13, wherein the release layer (44) is constituted by a sheet material.

16. A method according to claim 15, wherein the sheet material constituting the release layer (44) is a flexible material and is applied to the reinforcing sheet or plate or to one of the reinforcing sheets or plates (46; 48; 52; 54) on the face thereof which is to be released, before this reinforcing sheet or plate is introduced into the fissure (16).

17. A method according to claim 15, wherein the releasing sheet material (44) is in the form of a substantially rigid panel which is introduced into the fissure (16) together with the reinforcing sheet or plate or the reinforcing sheets or plates (46; 48; 52; 54).

18. A method according to claim 13, wherein the release layer (44) is a fluid product which is spread beforehand onto the reinforcing sheet or plate or onto one of the reinforcing sheets or plates (46; 48; 52; 54).

19. A method according to claim 13, wherein the reinforcing sheet or plate or at least one of the two reinforcing sheets or plates is a glass sheet (52).

20. A method according to claim 4, wherein the sheet or plate reinforcing material inserted in each fissure (16) is constituted by a plurality of strips placed side by side and edge to edge in the sense of a height of the respective fissure.

21. A method according to claim 14, wherein the release layer (44) is constituted by a sheet material.

* * * * *